United States Patent Office 3,689,290
Patented Sept. 5, 1972

3,689,290
PARTICULATE FOOD PRODUCT
Hoyt A. Blackstock, Canoga Park, and Nicholas D. Ross, Northridge, Calif., assignors to Carnation Company, Los Angeles, Calif.
No Drawing. Filed June 13, 1969, Ser. No. 833,166
Int. Cl. A23l 1/10, 1/22
U.S. Cl. 99—140
2 Claims

ABSTRACT OF THE DISCLOSURE

A dry particulate food product is provided by blending together fat, such as vegetable fat, a dry, bland particulate organic carrier, such as food starch, flavoring agent, with or without coloring agent to provide the flavor and appearance of selected food, and then coating the resultant mixture with dry powdered coating agent, such as powdered hydrolyzed cereal solids, having a smaller particle size than that of the carrier.

---

Commercially available grated or otherwise granulated cheese is traditionally prepared from such natural cheeses as Cheddar, Romano, Parmesan and the like, suitably particulated. In order to provide a desirably strong, stable and appealing flavor, the cheese used must be of good quality. Grated, ground, granulated and powdered cheeses usually are relatively expensive per unit weight, and are mainly used for toppings for salads, soups, vegetables, and main dishes such as macaroni, spaghetti and the like. Certain difficulties have been encountered in obtaining such cheese products with good shelf life, relating freedom from excessive desiccation or hardening and having flavor longevity. Some considerable effort has been made to improve the protective nature of the packaging in which such products are disposed for sale, in order to overcome these problems. This, in turn, has further increased the cost of these products.

It would be desirable to provide a particulate cheese product which is inexpensive, does not require special packaging and which is of suitably high quality, flavor and shelf life.

It would also be desirable to provide particulate food products useful for toppings, garnishes and the like having comparable performance and embodying formulations similar to those employed for the aforesaid particulate cheese product.

Accordingly, it is an object of the present invention to provide a particulate food product which is inexpensive, of high quality, has suitable shelf life, resistance to hardening and desiccation and which retains flavor for a reasonable period of time.

It is also an object of the present invention to provide a simple inexpensive method of making such a product.

It is a further object of the present invention to provide a product having the properties of grated, flaked, granulated or powdered food, such as cheese, bacon bits or the like, at low cost, and in a simple, reproducible manner, and useful as a topping, garnish or the like for food dishes.

Further objects and advantages of the present invention will be apparent from a study of the following detailed description.

The present invention is as generally described in the abstract set forth herein. More particularly, the present method provides food particles, such as synthetic cheese particles, characterized by low cost, good quality and shelf life, suitable granulation, flavor and appearance. The particles are useful as garnishes, toppings and the like and each include a substrate of the carrier, preferably of about 12–100 mesh size and of a relatively flat or flake-like configuration, a layer of fat on the surface of the substrate and an exterior powdered or dusted coating of coating agent. Flavoring agent and usually coloring agent are also present, usually mixed with the fat and/or with the carrier.

Now referring more particularly to the components of the present product, a suitable bland carrier is employed. The carrier is organic, inexpensive, edible and capable of being particulated to desired size and configuration. For such purposes, it has been found that food grade flaked starch particles, gelatinized or ungelatinized, can be used. Ungelatinized flaked food starch is preferred. Other suitable carriers such as flaked corn meal, soy flakes, so-called pearl starch and the like can be employed. In general, bland vegetable starch and/or protein substances, with or without fibrous matter, can be employed. It is important to control the shape and size of the carrier particles, preferably to about 12–100 mesh and generally relatively flat for grated synthetic cheese, onion flavored garnish, garlic flavored garnish or the like or round or ovoid for granulated synthetic cheese, bacon bits, etc. The particles must have sufficient strength so as not to produce excessive fines during manufacture, but not so strong as to provide undesirable chewing qualities or so-called undesirable chewing qualities or so-called undesirable mouth feel. Flaked starch particles closely simulate natural cheese and bacon particles in texture and, accordingly, are preferred.

The carrier is present together with fat in the finished product in a combined major proportion. Usually, that combined weight percentage is about 70–90, with respect to the total product, the carrier usually, although not necessarily, being present in a concentration of about 44–74 weight percent and the fat usually being present in a concentration of about 10–40 weight percent. A practical lower limit for the concentration of carrier is that needed to impart the desired particulate nature to the product and support the remaining ingredients. There is no upper limit for the carrier concentration except that dictated by the other constituents of the product, such as fat, present in substantial amounts to approximate the texture, etc. of cheese, and as otherwise specified hereafter. Generally, a decrease in the carrier is accompanied, in suitable formulations, by an increase in the fat, and vice versa.

The fat in the product can be any suitable edible fat, that is, that which is termed edible fat or edible oil. Usually, such fat is edible vegetable fat, for example, one or a blend or refined cottonseed oil, peanut oil, corn oil, coconut oil, refined soybean oil and the like, hydrogenated or unhydrogenated, depending on the oil. The melting point preferably is below about 100° F., although oils which are liquid well below this temperature and those which are solid above this temperature are also suitable. If the concentration of fat in the product exceeds about 40 weight percent, the product becomes "wet" and "sloppy" and is unsuitable. When the fat concentration drops below about 10 weight percent, the product becomes decidedly "dry" and unsuitable, causing loss of desirable "smoothness" and "mouth feed," well known organoleptic properties.

Edible flavoring agent is employed which includes one or more edible organic dry or liquid ingredients which impart to the product a typical cheese, onion, garlic, bacon or other flavor, depending on the particular end use of the product and the nature of the product desired to simulate. For the purposes of and throughout the present application for this and other ingredients, by the term edible is meant matter which can be eaten in the indicated amounts without harm, whether or not it can be biologically assimilated and/or has nutritional value. For example, various acids, such as lactic, caprylic, butyric, caproic, isovaleric and acetic can be used. Other organics such as propanal, propanol, butanal, butanol, propanone, butanone, pentanone, delta-lactones, methyl acetate ethyl acetate, methyl butanoate ethyl butanoate, dimethyl sulfide, diacetyl, methyl-n-amyl ketone and butyl butyryl lactate can be used. Other ketones, acids, esters, lactones, alcohols, aldehydes and the like can be used to provide, for example, a cheese flavor. Inorganic flavoring such as sodium chloride usually also is utilized. Concentrated natural and/or synthetic essences of onion, garlic and the like can be used. Smoked flavors can be employed, such as those formed by condensing hardwood smoke or the like. Usually, a small total concentration of flavoring agent is used, for example, 0.5–5 weight percent, or the like. In some instances, several individual ingredients comprise the flavor agent, some of which may be added to the fat and some mixed with the carrier.

A small amount fo edible, organic coloring preferably is employed, for example about 0.05–1.0 weight percent of a liquid color simulating the color of cheese i.e. yellow, orange, orange-yellow, tan or the like, for example, annatto food coloring, or the like. In the case of synthetic bacon bits, brown color can be employed. Green colors can be used for onion and garlic-type products. It will be understood that any other suitable coloring can be used in any suitable concentration. In some instances a coloring agent will not be required because the natural color of the mixture of carrier, fat and flavoring agent is adequate.

The coating agent can be any one or more suitable edible powdered coating materials, preferably of vegetable or cereal derivation, and preferably characterized by low hygroscopicity and free flowability. Preferably, the coating agent has an average particle size less than that of the carrier, so that a plurality of the particles of coating agent are required to cover the surface of the fat encapsulated carrier particle. The purpose of the coating agent is to give free flowability to the product. The fat coated carrier particles otherwise might well have a tendency to adhere together, or at least resist pouring. The coating agent, however, covers the fat coated surfaces and is of such a nature that particles of fat coated carrier with the coating agent thereon readily pass by and do not stick to similar adjacent particles. The coating agent comprises, for example, hydrolyzed cereal solids, such as low D.E. (Dextrose Equivalent) dry corn syrup solids in powdered form. Powdered starch, with or without free-flowing agents, can also be used. So also can other powdered edible substances, such as powdered fructose, lactose, dextrose or other sugar with a lower sweetness level than sucrose, although the latter can be used. The coating agent can also be a suitable inorganic, such as powdered salt (sodium chloride), a clay or the like, although organics are preferred. The concentration of coating agent usually is relatively low, for example, about 10 weight percent although it can vary widely and has been successfully utilized in concentrations of about 2–25 weight percent. It will be understood that any suitable concentration can be used.

It will be further understood that the individual ingredients are selected for the carrier, fat, coating agent, flavoring and coloring agent (if any) to best duplicate the selected particulated natural cheese, bacon, onion or the like desired.

In preparing the present product according to the present method, the fat, flavoring agent and carrier are blended together, after which the resultant mixture is blended with the coating agent for the previously described reasons. The blending can be carried out in any suitable manner. Preferably, the dry ingredients (carrier and any dry flavorings, such as salt, etc. are blended together, and a similar procedure is following for blending the liquid ingredients together (fat, liquid flavoring and coloring). In the latter instance, elevated temperatures, for example, 120–140° F., preferably are employed to bring the fat, if necessary, and/or other ingredients into the liquid state and/or facilitate blending. Preferably, the liquid mixture is then passed into contact with the dry mixture and blended therewith, for example, about 10 minutes, after which the coating agent is blended into the resultant mixture for, for example, about 5 minutes. The product then is ready for packaging.

The following examples further illustrate certain features of the present invention.

EXAMPLE I

A grated Parmesan-type synthetic cheese was produced by first blending in a ribbon-type blender about 65 parts of flaked food starch having an average particle size of about 100 mesh, about 1 part salt (sodium chloride) and 1 part dry particulate Romano cheese flavor. Said Romano flavor was disposed on a particulate gum arabic carrier (25% liquid flavor to 75% solid carrier). The Romano Cheese flavor had the following composition:

|  | Parts by weight |
|---|---|
| Butyl butyryl lactate | 5.00 |
| Diacetyl | 0.30 |
| Isovaleric acid | 1.00 |
| Methyl ethyl ketone | 0.20 |
| Ethyl butyrate | 1.00 |
| n-Butanol | 0.20 |
| n-Butyric acid | 2.00 |
| Acetoin | 10.00 |
| Ethyl propionate | 0.20 |
| Isobutyric acid | 1.50 |
| Methyl nonyl ketone | 0.20 |
| Caproic acid | 2.00 |
| Octanoic acid | 2.00 |
| Decanoic acid | 4.00 |
| Propylene glycol or vegetable oil | 20.40 |

A liquid mixture was then blended in a steam jacketed kettle at about 140° F. This mixture comprised 19 parts of a liquid formed of equal parts of hydrogenated coconut oil, soybean oil, and cottonseed oil, to which were added 3 parts of a low temperature (melting point) flavored vegetable fat, ½ part of lactic acid, 1/10 part part N-butyric acid, 3/100 part annatto food coloring and ½ part of imitation Parmesan cheese flavor. The Parmesan cheese flavor had the following composition:

|  | Parts by weight |
|---|---|
| Butyl butyryl lactate | 3.00 |
| Diacetyl | 0.20 |
| Isovaleric acid | 3.00 |
| Methyl ethyl ketone | 0.10 |
| Ethyl butyrate | 1.00 |
| n-Butanol | 0.05 |
| n-Butyric acid | 3.00 |
| Acetoin | 2.00 |
| Ethyl propionate | 0.50 |
| Isobutyric acid | 1.00 |
| Methyl nonyl ketone | 0.10 |
| Caproic acid | 3.00 |
| Octanoic acid | 4.00 |
| Decanoic acid | 4.00 |
| Propylene glycol or vegetable oil | 25.05 |

The resulting liquid was held at 120° F. while being pumped into the previously described dry mixture and being blended therewith in said blender for about 10 minutes. To the resultant mixture was then added, with blending, about 10 parts of hydrolyzed cereal solids and blending was continued for about 5 minutes, after which the product was passed to a packaging line, packaged in foil-lined cardboard containers, stored, and later tested.

It was found that the shelf life of the product was more than 12 months when so packaged. Moreover, the product had the color, odor, appearance, texture, taste and quality of grated Parmesan cheese but was substantially less expensive to produce. The particles of product were closely examined and found to comprise a flaked starch substrate covered with flavored fat, in turn dusted with the powdered cereal solids coating.

EXAMPLE II

In separate parallel tests conducted in accordance with Example I, the concentrations of the fat, carrier and coating agent of Example I were varied as follows:

| Test | A | B | C | D | E |
|---|---|---|---|---|---|
| Carrier | 50 | 48 | 52 | 44 | 74 |
| Fat | 20 | 20 | 32 | 40 | 10 |
| Coating agent | 20 | 25 | 10 | 8 | 11 |
| Flavoring agent | 10 | 6 | 5½ | 9/10 | 4¾ |
| Coloring agent | 0 | 1 | ½ | 1/10 | ¼ |

All products were acceptable regarding storage, flavor, appearance, color and odor. In Tests A and D, the flavoring agent comprised lactic acid, N-butyric acid and acetic acid, rather than the flavoring agent of Example I. In further tests, various mesh sizes and configurations of flaked and granulated corn meal and soy flakes were separately substituted for the flaked starch carrier of Example I and this example. Moreover straight peanut oil, corn oil and cottonseed oil and a vegetable oil having a melting point of 94-96° F. were separately substituted for the fat of Example I and this example. In addition, powdered starches, dextrose and fructose were separately substituted for the coating agent of Example I and this example. All substitutions established comparable results, utilizing the formulations of Tests A through E and that of Example I.

EXAMPLE III

Utilizing the method of preparation as set forth in Example I, an onion-flavored particulate topping for salads and the like was made. The topping had the following composition:

| | Percent by weight |
|---|---|
| Flaked food starch (av. particles to 100 mesh) | 59.05 |
| Liqiud oil (hydrogenated coconut, soybean and cottonseed blend) | 28.80 |
| Hydrolyzed cereal solids (low D.E.) | 10.85 |
| Salt | 1.00 |
| Oleoresin of onion solution (1% in propylene glycol) | 0.25 |
| FD & C green, and yellow | 0.05 |

The resulting product had somewhat the appearance, odor, taste and texture of freshly grated green onion, withstood aging and was of overall high quality.

In a separate experiment, the same general method of preparation as specified in Example I was followed, but utilizing about 130° F. for the liquid mixture blending and holding temperature, and 5 minutes for each blending time. However, the ingredients employed were as follows:

| | Percent by weight |
|---|---|
| Granulated food starch (average particles 50 mesh) | 56.70 |
| Vegetable oil (94-95%) melting point | 29.80 |
| Hydrolyzed cereal solids (extremely low D.E. 10) | 11.80 |
| Salt | 0.85 |
| Natural condensed hardwood smoke flavor in vegetable oil | 0.35 |
| FD & C green, blue and red color (forming brown) (1% in vegetable oil base) | 0.50 |

The product had the flavor, odor and appearance and texture of bacon bits and was highly appetizing, had a long self life and other desirable characteristics.

The preceding examples illustrate the utility, inexpensive nature and desirability of the present method and product of the method. In each instance, the product had a shelf life in excess of 12 months while stored at 70° F. in foil-lined commercial cardboard packaging.

It will be understood that various changes can be made in the present method, its parameters and steps and in the ingredients for the present method and product. All such changes as are within the scope of the appended claims form a part of the present invention.

What is claimed is:

1. A dry, particulate food topping or garnish consisting essentially of about 44%-74% by weight of a dry, bland edible organic substrate having a particle size of about 12-100 mesh, a layer of an edible fat on said substrate said fat comprising 10%-40% by weight of the product with the organic substrate and the fat together comprising about 70%-90% by weight of the product, a coating of an edible powdered material having low hygroscopicity on the exterior of said fat, said coating material comprising about 2%-25% by weight of said product and having an average particle size less than that of said substrate, and an edible food flavoring agent disposed in association with at least one of said fat and said substrate, wherein said substrate has a flake-like configuration and is selected from the group consisting of food starch, corn meal and soy flakes, said fat is a vegetable fat having a melting point below about 100° F., said coating agent comprises hydrolyzed cereal solids and the product contains about 0.05%-1.0% by weight of an edible coloring.

2. The product defined in claim 1 in which the product is synthetic grated cheese in which the substrate is food grade flaked starch, the coating agent is low D.E. corn syrup solids, the flavoring agent includes sodium chloride, lactic acid, n-butyric acid and synthetic Parmesan and Romano cheese flavors and the coloring agent comprises yellow organic coloring.

References Cited

UNITED STATES PATENTS

| | | | |
|---|---|---|---|
| 1,380,815 | 6/1921 | Luft | 99—124 |
| 1,884,923 | 10/1932 | Turner | 99—139 |
| 2,035,136 | 3/1936 | Levinson | 99—140 |
| 2,170,954 | 8/1939 | Stange | 99—140 |
| 2,373,805 | 4/1945 | Barker | 99—124 |
| 2,641,547 | 6/1953 | Evans | 99—140 |
| 3,116,151 | 12/1963 | Giddey | 99—124 |

FOREIGN PATENTS

| | | | |
|---|---|---|---|
| 224,363 | 10/1959 | Australia | 99—124 |

RAYMOND N. JONES, Primary Examiner

J. M. HUNTER, Assistant Examiner

U.S. Cl. X.R.

99—144